United States Patent
Fokine et al.

(10) Patent No.: US 6,973,247 B2
(45) Date of Patent: Dec. 6, 2005

(54) METHOD AND DEVICE FOR CONTROLLING THE REFRACTIVE INDEX IN AN OPTICAL FIBER

(75) Inventors: Michael Fokine, Bandhagen (SE); Lars-Erik Nilsson, Arsta (SE); Åsa Claesson, Stockholm (SE); Walter Margulis, Huddinge (SE); Leif Kjellberg, Stockholm (SE); Hania Arsalane, Saint Ouen du Tilleul (FR); Pedro Torres, Rio De Janeiro (BE)

(73) Assignee: Acreo AB, Kista (SE)

(*) Notice: Subject to any disclaimer, the term of this patent is extended or adjusted under 35 U.S.C. 154(b) by 0 days.

(21) Appl. No.: 10/482,304

(22) PCT Filed: Jul. 2, 2002

(86) PCT No.: PCT/SE02/01313

§ 371 (c)(1),
(2), (4) Date: Dec. 3, 2004

(87) PCT Pub. No.: WO03/005081

PCT Pub. Date: Jan. 16, 2003

(65) Prior Publication Data

US 2005/0157993 A1    Jul. 21, 2005

(30) Foreign Application Priority Data

Jul. 2, 2001 (SE) .................................... 0102381
Sep. 10, 2001 (SE) .................................... 0103008

(51) Int. Cl.$^7$ ............................. G02B 6/02; G02B 6/16
(52) U.S. Cl. ........................... 385/123; 385/8; 385/11
(58) Field of Search ........................ 385/2, 8, 11, 14, 385/123–126

(56) References Cited

U.S. PATENT DOCUMENTS

| | | | |
|---|---|---|---|
| 5,076,658 A | 12/1991 | Hayden et al. | |
| 5,182,783 A | 1/1993 | Bosc et al. | |
| 5,502,782 A | 3/1996 | Smith | |
| 5,970,186 A | 10/1999 | Kenney et al. | |
| 6,125,225 A | 9/2000 | Dianov et al. | |
| 6,221,565 B1 | 4/2001 | Jain et al. | |
| 6,345,121 B1 | 2/2002 | Jang et al. | |
| 6,845,202 B2 * | 1/2005 | Paek et al. | ........... 385/123 |

FOREIGN PATENT DOCUMENTS

| | | |
|---|---|---|
| CN | 1278605 A | 1/2001 |
| EP | 0 989 425 | 3/2000 |
| JP | 10-238708 | 3/2000 |
| WO | WO 87/03676 | 6/1987 |
| WO | WO00/04416 A | 1/2000 |
| WO | WO87/07255 A1 | 1/2000 |
| WO | WO 03/005080 | 1/2003 |

* cited by examiner

Primary Examiner—Phan T. H. Palmer
(74) Attorney, Agent, or Firm—Buchanan Ingersoll PC

(57) ABSTRACT

The invention relates to a method and a device for controlling the refractive index in the core of an optical fiber. According to the invention, an optical fiber is provided with a longitudinal electrode running along the core of the fiber. An electric current is passed through the electrode to induce ohmic heating thereof, causing thermal expansion and consequently a compressing force upon the core of the fiber. This compression of the core leads to induced changes in the refractive index in the direction of the compressing force, and hence induces or alters birefringence in the core.

23 Claims, 15 Drawing Sheets

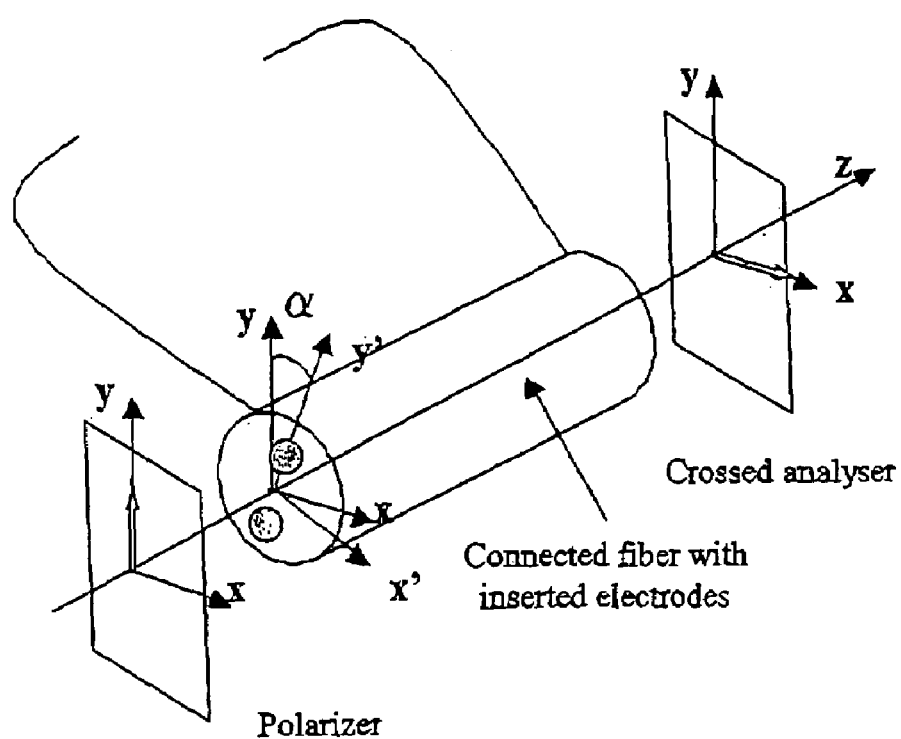
Fig. 9
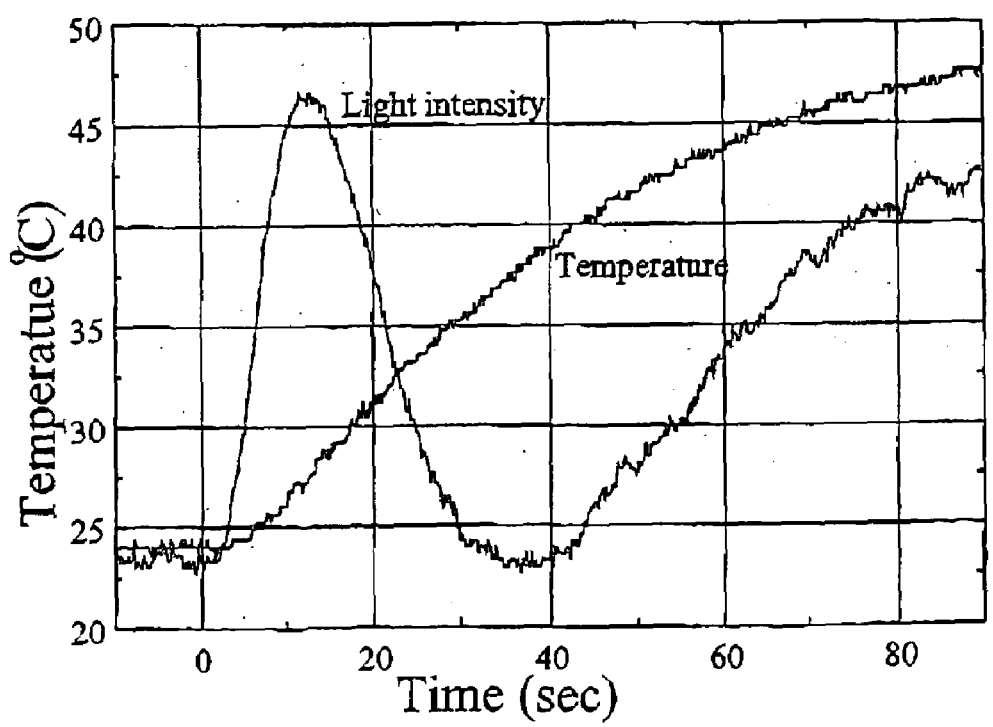

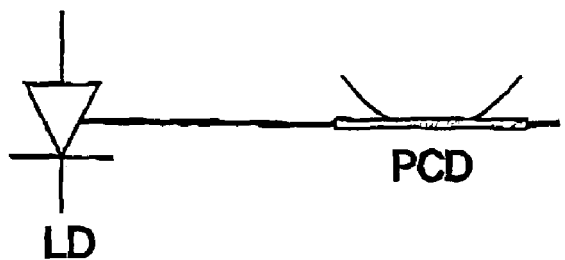
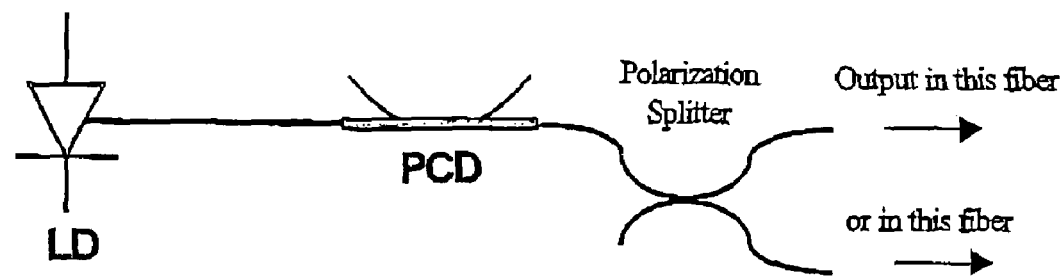
Fig. 17

METHOD AND DEVICE FOR CONTROLLING THE REFRACTIVE INDEX IN AN OPTICAL FIBER

FIELD OF THE INVENTION

The present invention relates to a device and a method, as well as uses thereof, for controlling the refractive index in an optical fiber. More particularly, the present invention relates to control of birefringence in the core of an optical fiber.

BACKGROUND OF THE INVENTION

The constant increase of information transmission capacity by means of optical fibers is mainly driven by the improved performance of new optical components associated with Wavelength Division Multiplexing (WDM) technology. Innovations in this field create new solutions for telecommunications networks, and bring optics closer to the end user.

From an initial passive transport role, optical fibers associated with other technologies are now commonly used in connection with active and passive optical components. By controlling the value and the spatial characteristics of the refractive index of optical fibers, a number of important optical functions such as switching and filtering can be provided. Control of the refractive index can be achieved by applying external perturbations such as electric or magnetic fields, light and elastic stress.

The Japanese Patent Abstract "Polarization Control Element" (Toshiaki), Application No. 10-238708 discloses an element wherein two conductors are arranged in the cladding of an optical fiber symmetrically with respect to the fiber core. When current is passed through these two conductors simultaneously, an electrostatic effect is obtained that gives a stress or a strain on the fiber core. If current is passed in the same direction through the two conductors, an attracting force is obtained between the conductors; and if current is passed in opposite directions through the two conductors, a repulsive force in obtained. Hence, depending on the direction of the currents passed through the conductors, the action on the fiber core can be either positive or negative. In this way, the refractive index of the fiber core is said to be controlled.

However, the above-referenced technique has some serious drawbacks that render actual implementation of the device very impractical, or perhaps even impossible. The force between the two conductors is very weak unless high currents are employed. Moreover, it is necessary to have at least two conductors in the fiber. Ideally, the above mentioned device should have no thermal dissipation and the conductors should have extremely low resistance. Hence, for practical reasons, such device will not gain any commercial success.

SUMMARY OF THE INVENTION

It is an object of the present invention to provide a device and a method for controlling the refractive index in a core of an optical fiber, for which the above-mentioned drawbacks are eliminated.

This object is achieved by means of a method and a device according to the appended claims.

According to the present invention, alteration of the refractive index of the fiber core relies not upon any electrostatic effect, but rather on thermal expansion of longitudinal electrodes arranged along said core, which expansion induces mechanical pressure on the core. Via the so-called photo-elastic effect, which will be explained below, the refractive index of the core is then changed accordingly.

When light travels in a cylindrical fiber, as opposed to when propagating in free space, its polarization state gets distorted due to random birefringence induced in the fiber by, for example, thermal stress, mechanical stress, and irregularities of the fiber core. Consequently, at any given point along the fiber, light is generally elliptically polarized with varying degrees of ellipticity and orientation. However, many devices in fiber optic systems, for example electro-optic modulators, are polarization sensitive. Therefore, the arbitrarily polarized light needs to be converted into a desired state of polarization.

According to the present invention, this conversion of the polarization into a desired state is effected by means of a length of optical fiber having at least one longitudinal electrode through which an electric current is passed, such that ohmic heating is obtained in the electrode. The heating of the electrode leads to expansion that compresses the core of the fiber. Consequently, the refractive index of the core is changed via the photo-elastic effect.

The present invention provides a basis for an electrically driven polarization controller, and a method of altering the refractive index in an optical fiber, particularly to control the birefringence thereof.

The present invention can be for both polarization dependent adjustment of the refractive index in the core of an optical fiber, as well as for polarization independent adjustment of the same. When a polarization dependent influence on the refractive index is desired, electrodes are disposed such that an asymmetrical stress field is induced in the core.

Furthermore, by arranging one electrode within the evanescent field from the core, the device according to the invention can be made lossy for light having a particular polarization direction, effectively providing a polarizer.

The present invention can be applied in various situations and applications, as will be appreciated from the following detailed description of preferred embodiments.

BRIEF DESCRIPTION OF THE DRAWINGS

Further aspects and features of the present invention will be appreciated when the detailed description of preferred embodiments is read and understood. In the description, reference is made to the accompanying drawings, on which;

FIG. 9 schematically shows a basic set-up for determining the influence on polarization achieved by a device according to the present invention;

FIG. 10 is a graph showing the measured light intensity in a set-up according to FIG. 9, when heating is applied externally;

FIG. 17 schematically shows how a device according to the invention is used for polarization control of the emission from a laser diode;

DETAILED DESCRIPTION OF PREFERRED EMBODIMENTS

In the following, preferred embodiments of the present invention will be described in more detail.

The fabrication of optical fibers having longitudinal, internal electrodes that run along the fiber core is described in Applicant's co-pending Swedish Patent Application No. 0102381-1, which is incorporated herein by reference.

However, for the sake of completeness, a summary of the fabrication technique is given below.

Figure 1:
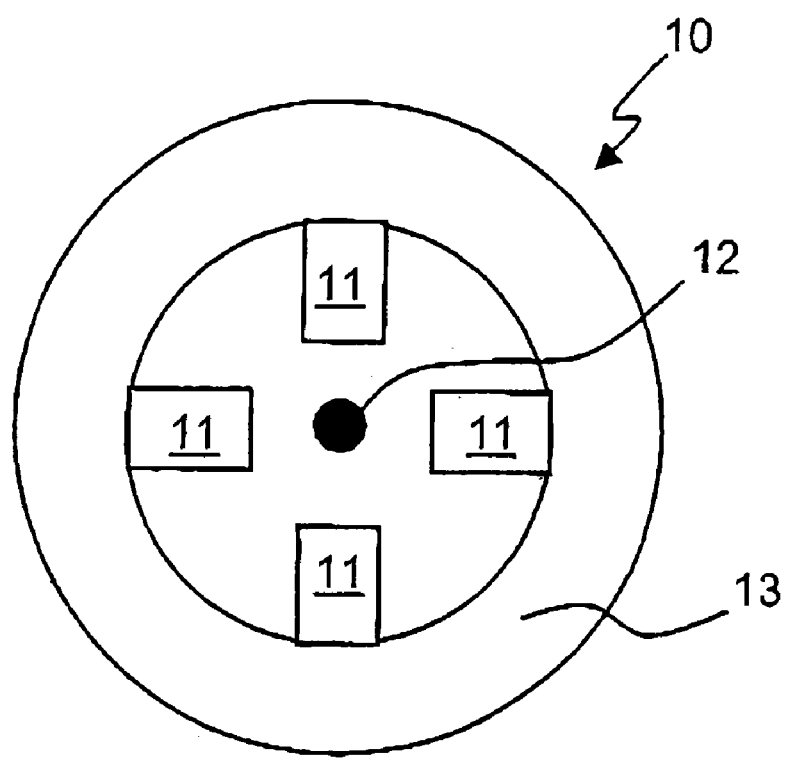
FIG. 1 schematically shows a cross section of a fiber preform having longitudinal cuts.

The manufacture of an optical fiber having longitudinal holes parallel to the fiber core is known in the prior art. The simplest way to prepare a preform so that the resulting fiber has longitudinal holes is to drill it with a diamond coated drill. The disadvantage of this technique is the limited length of fiber that can be obtained, since it is difficult to drill holes that are longer than a few centimeters in glass. This disadvantage can be remedied by, instead of drilling, cutting grooves 11 parallel to the core 12 of a preform 10 for standard transport fiber. These grooves 11 can be made using diamond-coated blades. This is schematically shown in FIG. 1. In addition, the preform is typically surrounded by a protective tube 13. The preform is then drawn into a 125 μm diameter fiber at high temperature (about 2000° C.).

Figures 2A, 2B:
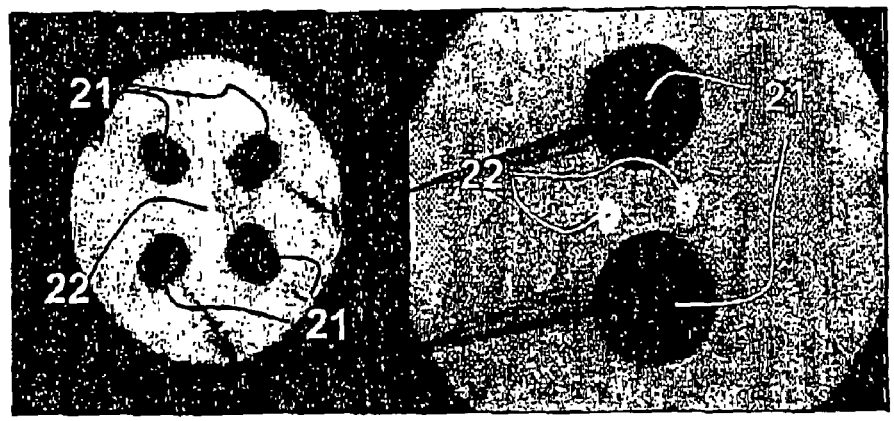
FIG. 2a shows a picture of a fiber cross section having one core and four longitudinal holes.
FIG. 2b shows a picture of a fiber cross section having two cores and two longitudinal holes.

Three particular realizations are shown in FIG. 2. The pictures in FIGS. 2a and 2b represent the cross-section of the fibers. It is noted that the holes, that were initially square and radially open in the preform, became round and radially closed after the drawing of the fiber. The diameter of the holes 21 is about 40 μm. FIG. 2a shows a fiber with one core 22 and four longitudinal holes 21, and FIG. 2b shows a two-core 22, two-hole 21 fiber.

Figure 2C:
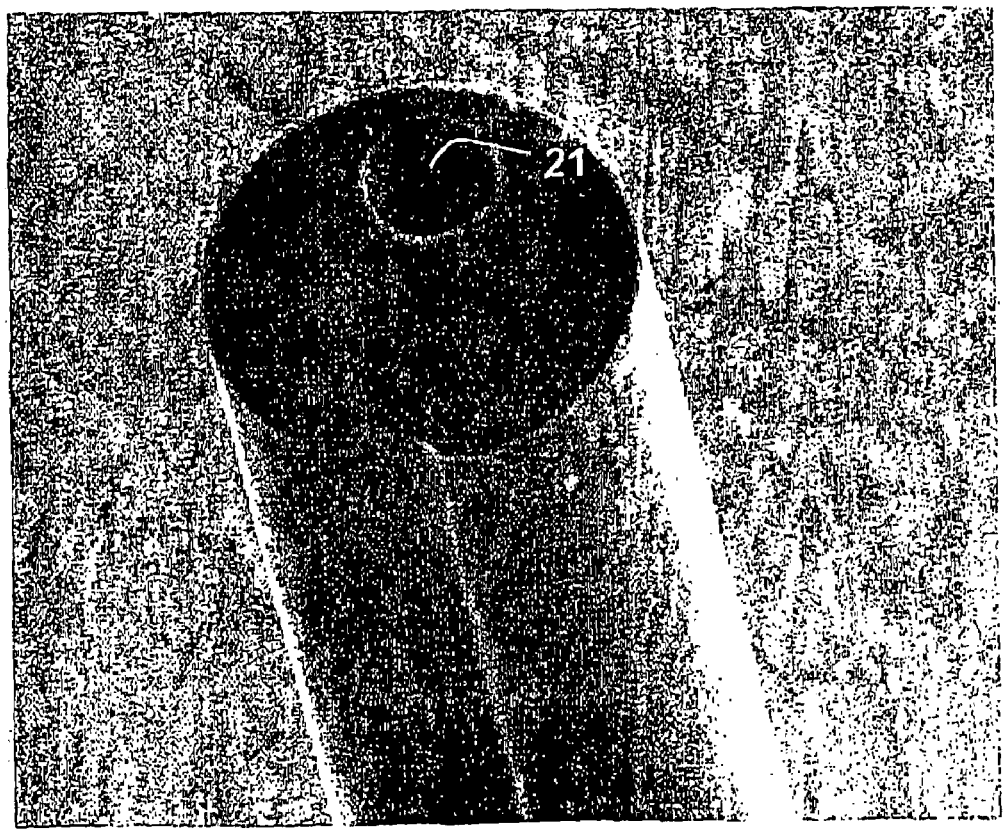
FIG. 2c shows a SEM-picture of a fiber having a longitudinal hole formed therein.

FIG. 2c shows a SEM-photograph (SEM=Scanning Electron Microscopy) of a fiber having one longitudinal hole formed in its cladding. The fiber is shown before electrode material was introduced into the hole. A recess on the outer surface of the fiber, opposite the longitudinal hole, can also be seen from the picture. This recess was used for aligning the fiber at a later stage, and has no optical influence on the device. The core of the fiber is not visible on the SEM-photograph. However, the fiber comprises an ordinary, centrally placed core.

The fabrication of fibers with holes makes it possible to insert electrodes within the fiber. In such a fiber, two different kinds of signals can be conducted: optical in the core and electrical in the electrodes.

In a device according to the present invention, electrode material will be introduced into these holes such that the hole is entirely filled with electrode material in its radial direction. This is necessary for the expansion of the electrode to induce a stress in the core of the fiber.

In order to insert the electrode(s), one has generally introduced thin metal wires into the holes. The thin wires are commercially available in various diameters, and are made of Aluminum, Gold, Tungsten or stainless steel. However, they tend to fasten to the sidewalls of the holes. This limits the length of the fabricated devices to some centimeters. Because the diameter of the holes is larger than of the wires, it is not possible to guarantee a uniform position of the wire in the hole along the fiber. Besides, the extra space between the wire and the fiber prevents the use of pressure from a thermally expanded wire as a way to affect the refractive index in the fiber.

In order to solve this problem, the solution as disclosed in the above-mentioned co-pending application has been developed, using an alloy with a comparatively low melting temperature and inserting the alloy into the hole(s) in liquid phase. This is the technique that has been used all along the experiments described below.

Figure 3:
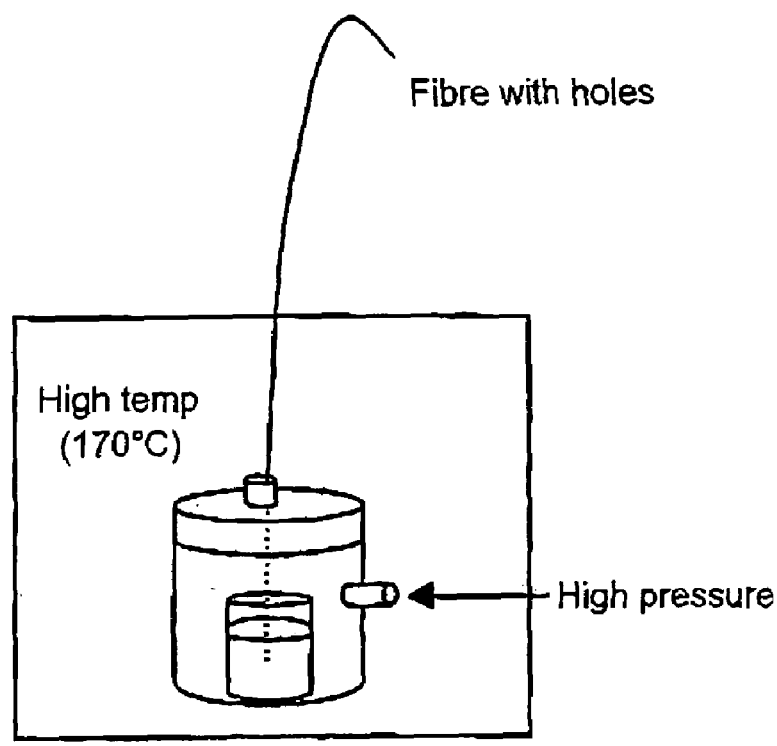
FIG. 3 schematically shows an arrangement for introducing liquid electrode material into longitudinal holes in a fiber.

In order to introduce the molten metal (the alloy) into the holes, a "pump technique" was used. A pressure chamber was placed in an oven. In the chamber, one end of the fiber was immersed into the molten metal. The other end of the fiber is outside the oven, at ambient pressure and temperature (see FIG. 3). The pressure difference forced the molten metal into the holes.

A Sn—Bi alloy was used with a melting point of 137° C. The oven temperature was typically 170° C. and the pressure in the chamber was 4 Bars.

By keeping one of the fiber ends outside the oven, the metal solidifies before reaching the far end. Due to the high pressure applied from the other end, the molten metal is under compression as it solidifies. Keeping one fiber end outside the oven has another advantage, that of keeping the fiber extreme free from metal, for facilitating-splicing to another fiber later on. In order to have the end of the fiber free from metal, the fiber end can be lifted from the molten metal, and subjected to the high pressure for a few seconds, so that the electrodes are displaced further into the fiber.

Figure 4:
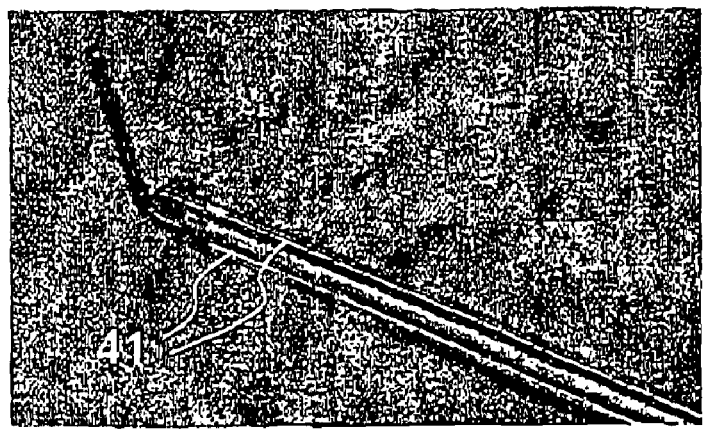
FIG. 4 shows a picture of a fiber with two longitudinal electrodes.

It is shown in FIG. 4 a fiber with inserted electrodes 41 realized with the technique described above.

The required electrical contacts can be provided from the side of the fiber, so that the fiber ends could be spliced. These contacts can be achieved by using a polishing machine with a rotating piece of abrasive paper (2400 mesh).

Figure 5:
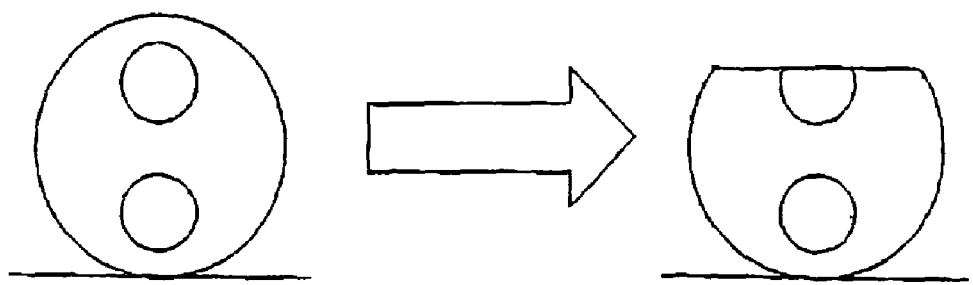
FIG. 5 schematically shows how one side of a fiber is grinded down to reveal an electrode from the side of the fiber.

The fiber to be polished is placed on the base so that the metal electrodes are vertical (see FIG. 5); the base onto which the fiber rests is made of glass with a smooth surface that prevents hurting the fiber. The fiber is kept straight by two fiber clip-on holders. One should be very careful with this last point because lateral movements of the fiber will make it break. The polishing machine is provided with sensors so that the rotation is interrupted when the discontinuity in the abrasive paper comes close to the fiber. Thus, the rotation oscillates between clockwise and counter-clockwise. Besides, the part that supports the fiber can translate so as to prevent the use of a single line of the abrasive paper. This polishing machine exposes the electrodes, as schematically shown in FIG. 5, after approximately 2 minutes.

Figure 6:
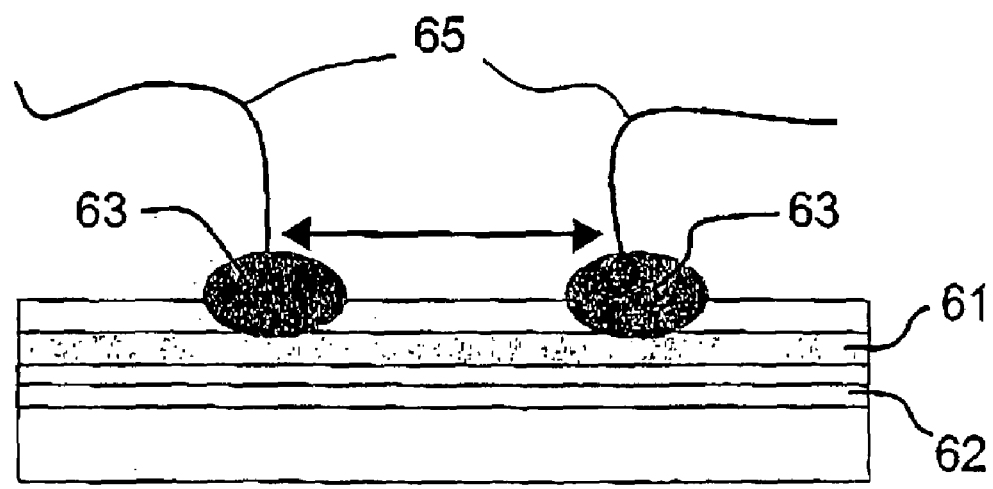
FIG. 6 schematically shows how external electric connections are attached to a longitudinal electrode within the fiber.

As schematically shown in FIG. 6, wires 65 can then be connected to the electrode 61 by using conductive epoxy 63 (Circuit Works Adhesive Conductive Epoxy CW2400). As shown in the figure, the electrode 61 is arranged in the cladding of the fiber adjacent the core 62 in order to induce a stress field in said core 62 when thermally expanded by ohmic heating. The wires 65 used in the experiments described below were made of silver-coated copper. The wires were simply placed on the exposed electrode 61 and fastened by means of the adhesive conductive epoxy 63. Room temperature drying can be achieved in 6 hours but to achieve faster drying times, one can heat the connection to a hundred degrees for ten minutes and then allow the epoxy to cool down to room temperature. Another technique that was tested in a few cases consists of soldering very thin wires by using the metal of the electrodes itself. Under a microscope, one could introduce the wire in the molten metal by using a soldering iron to heat the exposed electrode. Although this connection is more appropriated for high-frequency application, the epoxy was preferred because the connection created was stronger and easier to manipulate.

Figure 7:
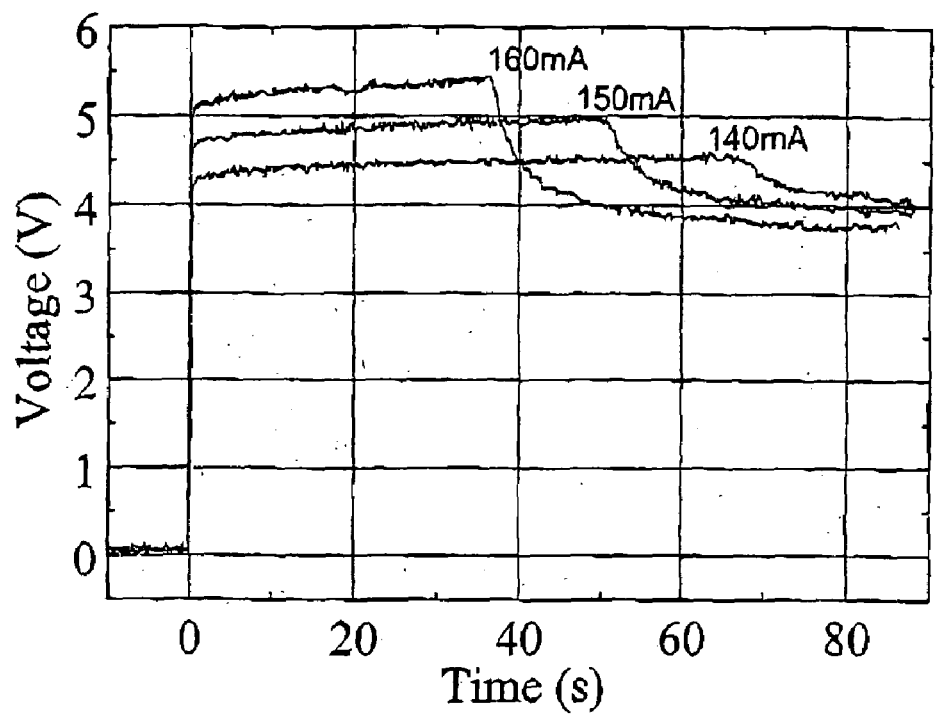
FIG. 7 is a graph showing the voltage over the device as a function of time for different applied currents.

Electrical currents having different values were passed through the device described above and the time evolution of the voltage developing across the component was recorded (see FIG. 7).

Let us call t the time in second. For the three currents shown in FIG. 7, namely 160 mA, 150 mA and 140 mA, a similar evolution was observed after the initial fast transient at t=0. During the initial few tens of seconds, the voltage increased slowly. This rise reveals the thermal dependence of the resistivity of the metal under ohmic heating. As the temperature reaches the melting point (138° C.), the voltage suddenly drops, revealing the phase transition of the alloy. The resistivity of the molten metal seems to be lower than the one of the solid metal. It will be noticed that the metal remains conductive when it is molten. As expected, the higher the current was, the faster the melting point was reached.

More precisely, as can be seen from FIG. 7, for a current of 160 mA, the resistance increases by 5.4% from 32.25 Ω at t=2 s to 34 Ω at t=36 s (point that corresponds to the beginning of the phase transition).

Assuming that the alloy used has a temperature coefficient $4.6*10^{-3}$° C.$^{-1}$ (the same as pure Tin and pure Bismuth), a 5.4% change in resistivity corresponds to a temperature rise $\Delta T=12$° C.

The relatively small value of $\Delta T$ measured between t=2 s and the melting point implies that the temperature of the metal at early times (before 2 s) is already as high as approximately 125° C. Assuming that the room temperature was 25° C., this implies that the temperature variation within the first two seconds was $\Delta T=100$° C. This variation corresponds to a 46% change of the resistance from its initial value to R=32.25 Ω at t=2 S.

Consequently, the initial resistance at room temperature should be equal to 22 Ω. This is in agreement with the theoretical value of the resistance and not with the measured value.

Figure 8:
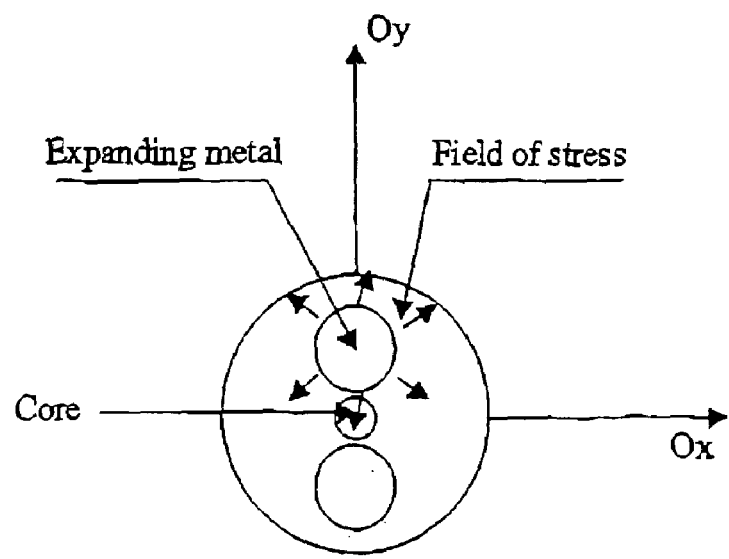
FIG. 8 is a schematic drawing showing the stress induced by thermal expansion of the electrode.

Below, the physics behind the present invention will be explained with general reference to FIG. 8.

An electric current that flows through a longitudinal, internal electrode in an optical fiber causes heating because of the Joule effect (ohmic heating). It can be assumed that the temperature resulting from the heating is homogeneous. This is typically valid for time-scales longer than milliseconds.

In order to change the polarization of light propagating in optical fibers, the present invention teaches the use of a field of elastic stress. When light is propagating along the fiber, this stress generates what is called the photo-elastic effect described below. This field of elastic stress is created by the heating of the inserted electrodes, as will be described in more detail below.

When a material is subjected to a field of elastic stress, its local density is modified and consequently also its optical properties.

In the particular case of glass (which is a linear isotropic medium) and when no torsion is present, the changes in refractive index are directly linked to the applied stress field by the following relation:

$$\Delta\left[\frac{1}{n_i^2}\right] = p_{ij}d_j \ (i, j = 1, \ldots, 6) \tag{1}$$

where $n_i$ are the coefficients of the ellipsoid of the indices, $p_{ij}$ are the coefficients of the photo-elastic matrix and $d_j$ are the components of the deformation vector induced by the stress field.

Consider for example the case of a uniform stress d in the direction Oy applied to the core of an optical fiber of index n. The propagation direction of the light is Oz. If the expression above is developed to the first-order, the new indexes are given by:

$$\begin{cases} n_x = n - \frac{1}{2}n^3 p_{12}d \\ n_y = n - \frac{1}{2}n^3 p_{12}d \\ n_z = n - \frac{1}{2}n^3 p_{12}d \\ n_{xy} = n_{yz} = n_{xx} = 0 \end{cases} \tag{2}$$

Light polarized parallel to Ox does not experience the same index as light polarized parallel to Oy. It is the difference between these two values that is the origin of the concept of birefringence Δn.

In this case, the induced birefringence is proportional to the stress:

$$\Delta n = |n_x - n_y| \frac{1}{2} n^3 (p_{12} - p_{11}) d$$

Then, one of the most important consequences of the photo-elastic effect is the apparition of linear birefringence. Two plane-polarized waves may propagate without any deformation in terms of polarization in the Ox and Oy directions. Ox and Oy are generally called the eigen axes of the fiber. The phase velocities of light polarized parallel to the respective axes are different and the phase difference is given by the following relation:

$$\Phi = \frac{2\pi}{\lambda} \Delta n * l \quad (4)$$

where Φ is the phase difference, λ is the wavelength of the propagating light, Δn is the birefringence, and l the distance of propagation.

The birefringence is a function of the local stress in the medium. Then, by controlling the applied stress, it is possible to control the induced birefringence and thus the phase difference that gives the state of polarization of the output light.

Thus, it has been shown that, whenever a field of stress is applied to the core of an optical fiber, an induced birefringence appears. In the preferred embodiment of the present invention, the special configuration of fibers was used with inserted electrodes of bismuth-tin alloy so as to create this field of stress. Indeed, by injecting current in one electrode, the inserted metal gets heated up due to the Joule effect (ohmic heating). During heating, the metal expands (see thermal properties of Bismuth-tin alloy in Table I) and a pressure is applied to the core of the optical fiber, i.e., a field of stress. This situation is schematically shown in FIG. 8.

TABLE I (Physical properties of BISMUTH-TIN 58-42)

| PHYSICAL PROPERTIES | VALUE | UNITS |
|---|---|---|
| Density | 8.56 | $g \cdot cm^{-3}$ |
| Thermal Coefficient expansion | 15 | $\mu m \cdot m^{-1} \cdot °C^{-1}$ |
| Heat capacity | 0.2 | $J \cdot g^{-1} \cdot °C^{-1}$ |
| Melting Point | 138 | °C. |
| Heat of fusion | 56.5 | $J \cdot g^{-1}$ |
| Volume change (liquid to solid) | 0.77 | % |
| Electrical Resistivity | $3.8 E^{-5}$ | Ohm · cm |

It should be noted that the expanded metal is constantly under compression from the solid cold regions of the electrodes that are adjacent to the heated regions. If the metal melts, it contracts (special property of the alloy used—see Table I) and this reduces the stress-induced refractive index change.

Furthermore, it should be noted that a fiber with longitudinal electrodes may already have birefringence due to the presence of the holes in which the electrodes are arranged. However, any such contribution to the birefringence will remain constant when the device is heated.

The Joule Effect (the ohmic heating) increases with current. The higher the temperature, the more the metal expands, and the higher the pressure applied to the core. As the stress is not the same in the Ox and Oy directions, the current flow through the electrodes induces additional birefringence, the magnitude of which is directly linked to the value of the injected electric current.

In the following, a theoretical framework for determining the change in the refractive index in a core of an optical fiber will be given.

Reference is now given to the configuration shown in FIG. 9. For a monochromatic wave propagating in the direction Oz, the eigen axes are Ox' and Oy'. Under the influence of an electric current flowing through the longitudinal electrode and the thermal expansion thereof, the fiber introduces a phase difference Φ between the linear states of polarization along Ox' and Oy'. The fiber acts as a wave plate. This fiber is located between a polarizer and an orthogonally oriented analyzer (crossed polarizers), the polarizer being aligned with the Oy axis, thus passing light polarized parallel to this axis.

The state of polarization of a monochromatic wave may be represented by a vector V called a Jones vector. Concerning optical devices that modify the state of polarization, such as polarizers and phase-shifting plates, they are each described by a matrix, called a Jones matrix, in the formalism.

Let Oxyz be the laboratory's reference system. As the system is illuminated by a wave of intensity $I_0$, the emerging Jones vector V' is expressed by:

$$V' = \sqrt{\frac{I_0}{2}} P_x M P_y \begin{bmatrix} 1 \\ 1 \end{bmatrix} = \sqrt{\frac{I_0}{2}} \begin{bmatrix} i \sin 2\alpha \sin \frac{\Phi}{2} \\ 0 \end{bmatrix} \quad (5)$$

With $$P_y = \begin{bmatrix} 0 & 0 \\ 0 & 1 \end{bmatrix} \text{ and } P_x = \begin{bmatrix} 1 & 0 \\ 0 & 0 \end{bmatrix}$$

the Jones matrix of, respectively, the polarizer and the analyzer.

The Jones matrix for the fiber, in the laboratory system, given by:

$$M = \begin{bmatrix} \cos \frac{\Phi}{2} + i \cos 2\alpha \sin \frac{\Phi}{2} & i \sin 2\alpha \sin \frac{\Phi}{2} \\ i \sin 2\alpha \sin \frac{\Phi}{2} & \cos \frac{\Phi}{2} - i \cos 2\alpha \sin \frac{\Phi}{2} \end{bmatrix} \quad (6)$$

where Φ is the phase difference introduced by the fiber, and α is the angle defined between the eigen axes and the laboratory's reference system.

Then, the transmitted intensity I is given by:

$$I = \frac{I_o}{2} \sin^2 2\alpha \sin^2 \frac{\Phi}{2} \quad (7)$$

Equation 10 shows that the transmitted light intensity hold the phase information for the light emerging from the device.

Note:
The function that represents the transmitted light intensity is $2\pi$-periodical for $\Phi$.

If $\alpha=\pi/2$ or $\alpha=0$ then $\sin 2\alpha=0$. In this case, information about $\Phi$ can not be obtained because the transmitted light intensity is then equal to zero. Moreover, in this case, the phase difference introduced is always equal to zero because the eigen axes of the fiber are aligned with the polarizers, and the device cannot rotate the polarization with added birefringence.

Experimental Results

The inventive principle was tested using a set-up as outlined in FIG. 9.

A preliminary study was performed in which a fiber with two internal metal electrodes was heated externally by means of a Peltier heater element. FIG. 10 shows the time evolution of both temperature and light intensity as measured at the detector.

It is noted that the optical signal is affected by the change of temperature induced by the Peltier. By heating the fiber, the electrodes are heated, try to expand and apply pressure to the core of the fiber. This gives the change in the phase difference and explains the variation of light intensity.

Even if it can be held that the way to affect the refractive index by external heating may not present identical characteristics as the way to affect it by an internal, thermally expanded electrode, this result show that the optical output signal is highly sensitive to temperature disturbances.

Figure 11:
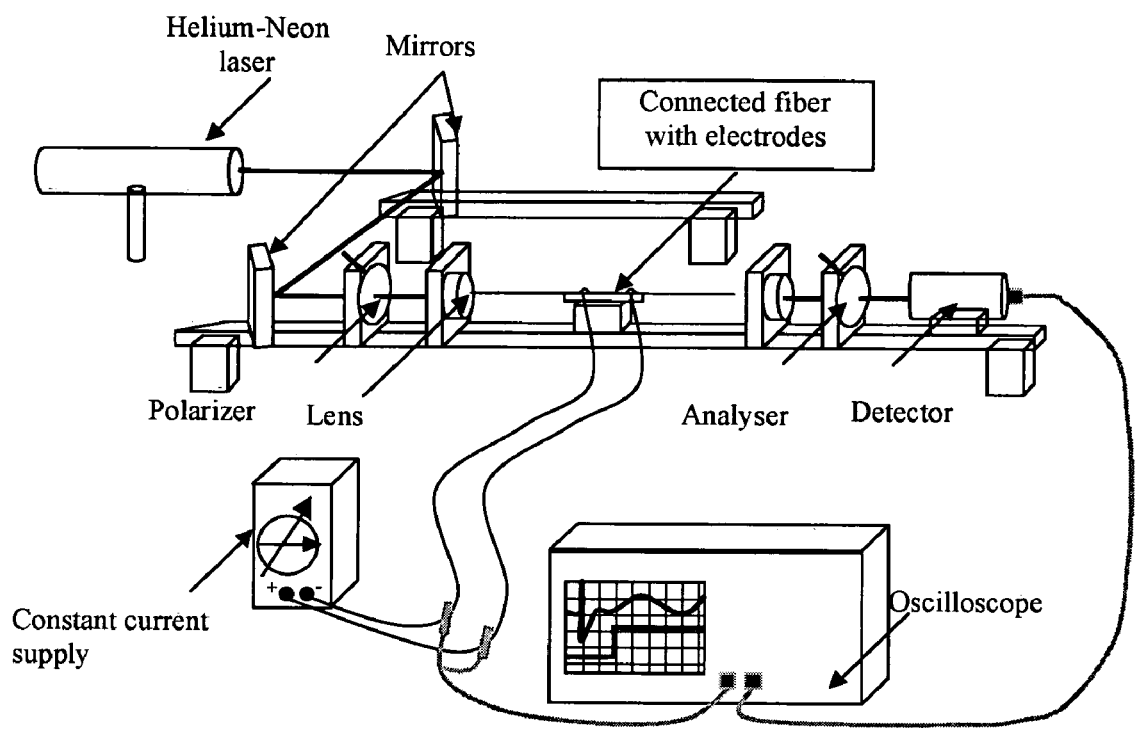
FIG. 11 schematically shows the actual arrangement used for determining the influence on polarization achieved by the device according to the present invention.

The light source used for these preliminary experiments was a visible Helium-Neon laser ($\lambda$=632 nm) which made easy the alignment of the optical bench. The set-up is schematically shown in FIG. 11. A polarizer provided for an input beam that was linearly polarized with an adjustable direction. The beam was coupled into the fiber by means of a lens. The light went through the fiber with longitudinal electrodes and was collimated onto the detector by a second lens. In front of the detector, a second polarizer was provided in order to analyze the phase of the output wave.

The constant current supply gave an adjustable control of the injected electrical current into the electrode of the fiber.

Both signals, optical and electrical, could be displayed simultaneously on the screen of a digital oscilloscope (Tektronix-TDS 784A).

As electric current was passed through the electrode in the fiber, significant change in the transmitted light intensity was noticed.

Figure 12:
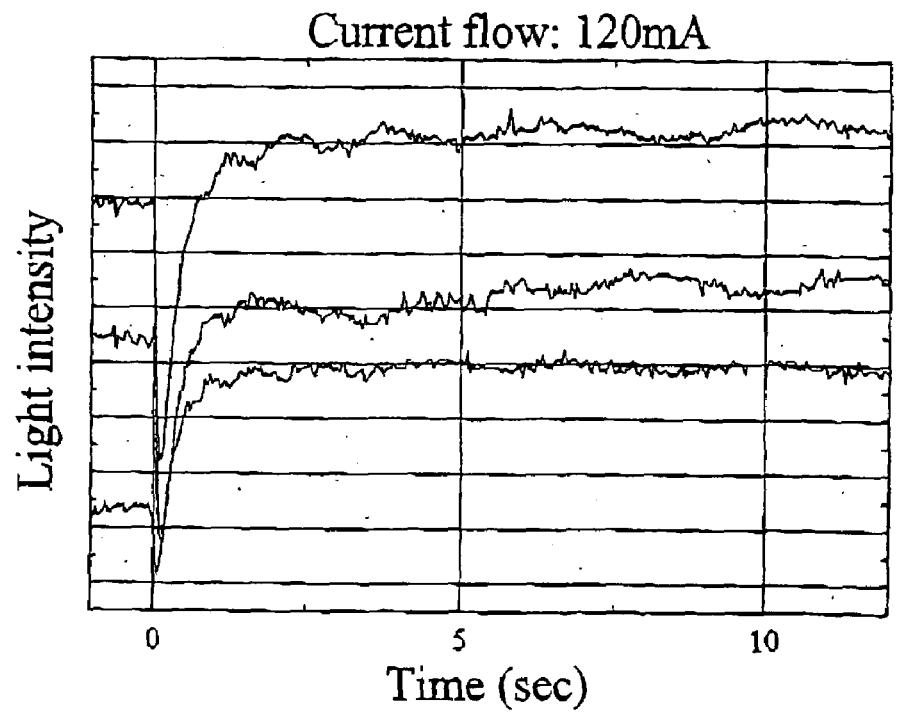
FIG. 12 is a graph showing the output light intensity for different angles α between the lab reference frame and the eigen axes of the device.

FIG. 12 shows the result using a current of 120 mA that was passed through one electrode of a 5 cm long device, for three different setting of angle $\alpha$ (compare FIG. 9). The initial phase differences (between the polarization components) of the three output waves are equal, as the fiber device is not subjected to any perturbation.

But the three initial light intensities are not equal because, for each of them, the value of $\alpha$ is different. As the current was applied at t=0, an added birefringence was induced and therefore the phase difference $\Phi$ changed. The three curves should present a sinusoidal variation in an ideal case, but as the temperature did not increase linearly with time, the induced phase difference was not linear with time. Instead, the curves observed present a chirped sinusoidal variation.

The closer the value of $\alpha$ is to $\pi/4$, the larger is the intensity variation of the transmitted light. Therefore, it is preferred to have this particular setting for the angle $\alpha$, as measurements at this angle are the most sensitive.

The three negative peaks observed at t=0 are neither equal to each other, nor equal to zero. The reason for this was that the detector used was not fast enough.

Figure 13:
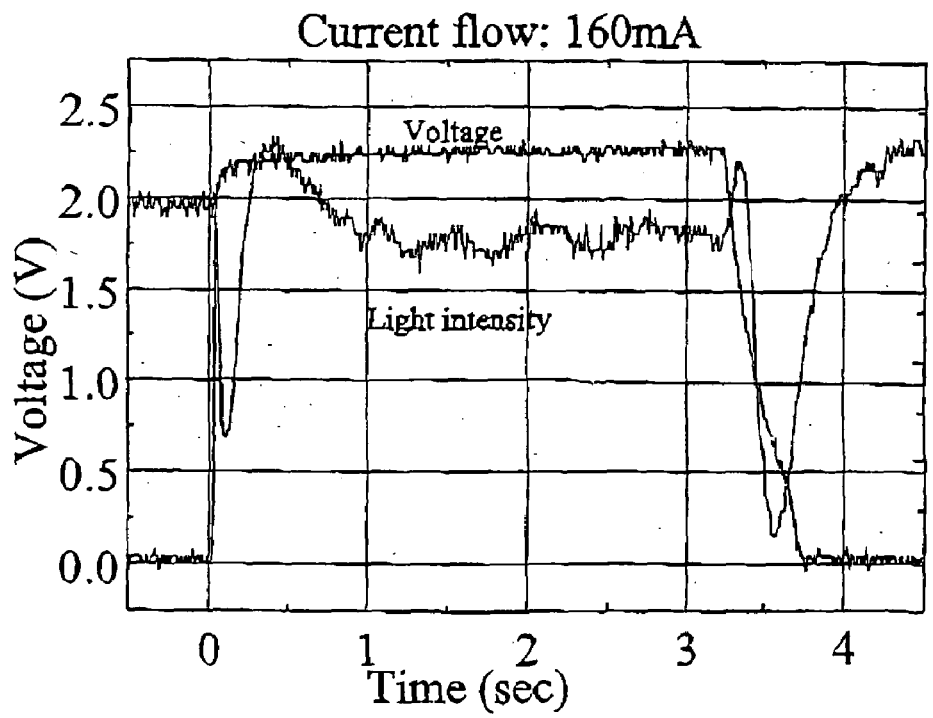
FIG. 13 is a graph showing output light intensity and voltage across the device when a current is passed through the electrode for about 3 s.

As shown in FIG. 13, it was demonstrated that large phase differences could be induced with low applied power. When the current was switched on, the temperature of the metal increased to 100° C. within a fraction of a second, producing pressure and inducing added birefringence in the fiber core. After one second, the temperature change was small and slow, and the optical signal varied only slightly until t=3.2 s when the current was switched off. At that time, the opposite phenomenon occurred, making the phase difference go back nearly to its initial position. In the case above, a phase difference was induced that took the light intensity back to and past its initial value. This implies that more than $2\pi$-phase difference was induced with less than 0.3 W of electrical power.

Figure 14:
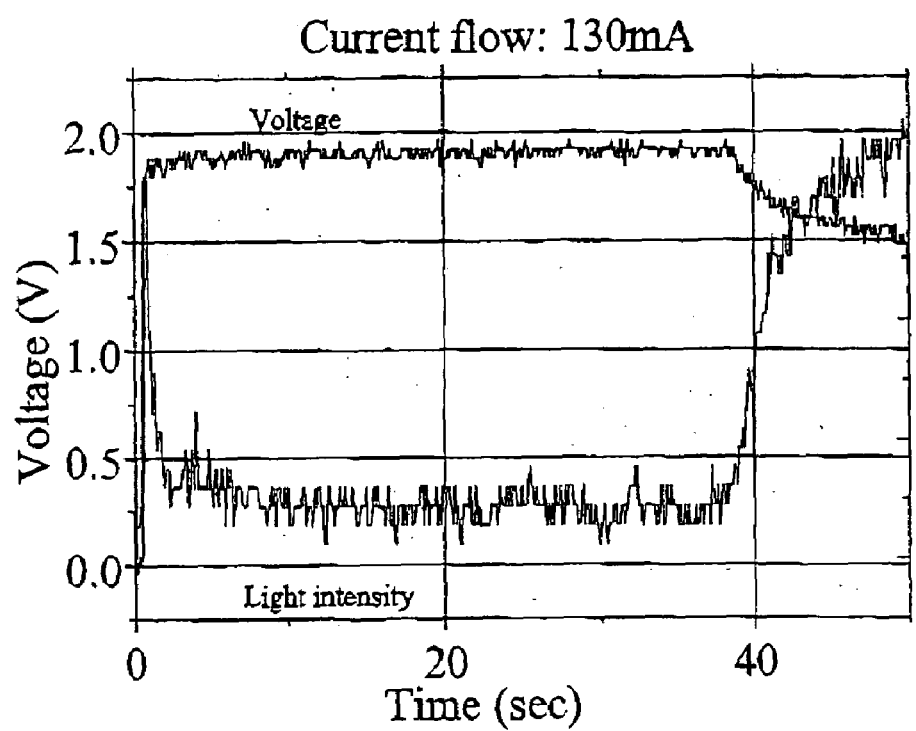
FIG. 14 is a graph showing the effect when the is electrode material is melted.

One obvious question that can be raised is whether the induced birefringence arises from pressure exerted by the expanding metal in the electrode or directly from the temperature change. To test this, a similar measurement was performed, but now waiting for the metal to melt. The effect on the optical signal was recorded, and is shown in FIG. 14. It should be recalled that the phase transition from solid to liquid takes place without any temperature change, then such an experiment allows the study the effect of pressure alone.

Consider the electrical signal representing the evolution of the voltage across the component, i.e., proportional to its resistance. It presented the same time evolution as has already been shown in FIG. 7, a first level reached quickly after the current was switched on, and further a sudden drop at t=38 s showing that the metal has melted. These two points determined the evolution of the optical signal. As previously, the level of current induced a change in the phase difference. The second point shows the influence of only pressure in inducing birefringence. When the metal melted the temperature remained constant. Therefore, the only phenomenon that could explain the sudden change of the optical signal was a sudden change of pressure at the melting point for the electrode material. As mentioned above, when the alloy melts it contracts, and thus the compression to which it was subjected drops to zero. This removes the stress-induced refractive index change.

Note that calculations, assuming that the system is adiabatic and that the alloy has a heat of fusion of 56.5 J.g$^{-1}$ (proportional ratio between the heat of fusion of the pure Bismuth and the one of the pure Tin) predict that it would take 50 ms to melt the whole mass of alloy. But one can note from FIG. 14, that the time until this transition is at least between t=38 s and t=45 s. This long time transition reveals the loss of energy by dissipating heat in the environment (into the fiber).

Experiments Using a Polarimeter

The device according to the invention was further tested using a commercial polarimeter (Profile PAN 9009).

The fiber used for the following tests was a two-hole two-core fiber (see FIG. 2b). Unintentionally, only one hole was filled with metal. The length of the device, i.e., the distance between the two external connections along the longitudinal electrode was around 2 cm. The measured resistance of the device thus created was 11.6 $\Omega$. A spliced standard single mode optical fiber was used for coupling input light into one core of the two-core fiber. The total length of the piece of fiber tested was 30 cm.

It is noted that the distance between the center of the cores in this fiber was about 26 μm, and the shortest distance between the centre of one of the cores and a metallic surface was 13 μm. No optical coupling between cores was observed in this experiment.

Results Using Light at 1550 nm

The fiber device was tested at various values of electric current. The wavelength of the probing light in this experiment was 1550 nm. It was provided by a tunable external cavity laser diode (Photonetics-Tunics Purity). The light input into the fiber device was highly polarized.

The maximum phase difference observed was 15° when the current was as high as 160 mA. The 30 cm-long fiber behaved as a polarizer. This was verified by measuring the Polarization Dependent Loss (PDL) of the piece of fiber. The PDL is defined as the difference between the maximum and the minimum insertion losses for all possible input states of polarization. For example, a polarizer has a very high PDL, and a polarization independent component has a PDL close to zero. We obtained PDL measured to 40 dB, i.e., a $10^4$ extinction ratio. The very large attenuation of one state of polarization can be attributed to the presence of the metal (the electrode) in the hole near to the core. Indeed, at 1550 nm, the electromagnetic field is not confined to the core, but has a part that travels in the cladding of the fiber. Thus, the wave polarized in a direction parallel to the axis defined by the electrodes (Oy' in in FIG. 9) is absorbed by the presence of the metal.

Conclusion: In this particular case, where the center of the core to metal distance was 15 μm, the wavelength 1550 nm and the metal-filled fiber length was 30 cm, it was not possible to prove an electrical control of the polarization.

Instead, the interaction of the evanescent field with the internal electrode resulted in an excellent fiber polarizer at 1550 nm for all values of the current tested.

Results Using Light at 808 nm

To corroborate the results achieved with the experimental set-up using cross polarizers and Helium-Neon laser described above, measurements was made using a laser whose wavelength was close to that of the Helium-Neon laser. The wavelength was longer than the short-wavelength cut-off of the polarimeter employed (700 nm). An unpolarized fiber-coupled laser-diode source running at 808 nm was available (Opto Power Corporation-OPC D010 808 HBHS), and a very small fraction of the maximum power output was used in the measurement (about 0.1 mW). In this case, as in the case of Helium-Neon laser, the electromagnetic field should be much more confined to the core of the fiber, and thus, far less disturbed by the presence of the electrode in terms of attenuation.

As the electrical current flowing in the fiber device was slowly increased, the point representing the state of polarization in the Poincaré sphere shifted in a meaningful way.

Figure 15:
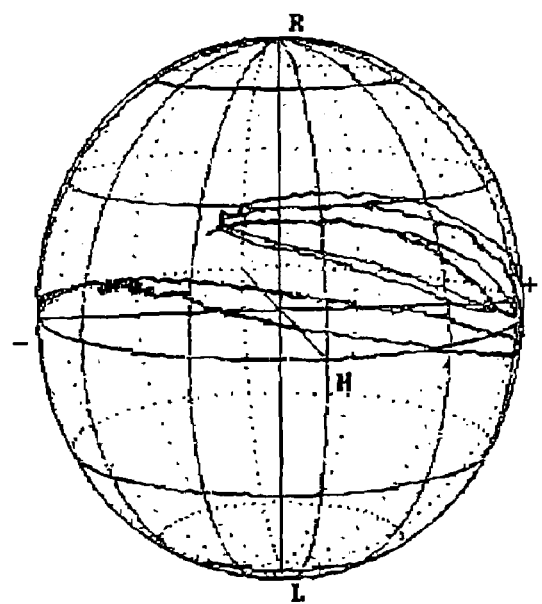
FIG. 15 is a graph showing the state of polarization on a Poincaré sphere as the electric current through the electrode was increased to 150 mA and then back to zero.

FIG. 15 illustrates the path of the state of polarization in the Poincaré sphere as the electrical current was increased up to 150 mA, and then decreased to zero.

Figure 16:
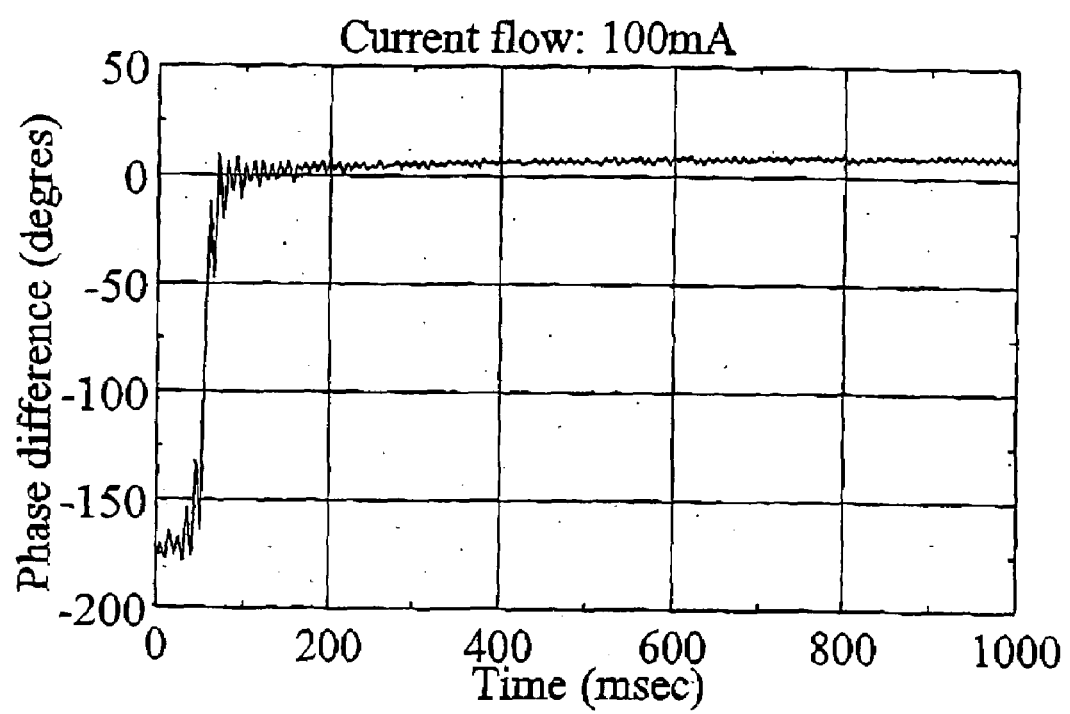
FIG. 16 is a graph showing the observed phase difference as a function of time when a current of 100 mA was passed through the electrode.

Since for systems applications there is a great interest in response times shorter than 50 ms, a good time resolution function of the polarimeter was used to determine the actual speed of the polarization control provided by the device. When an electric current of 100 mA was used, the result shown in FIG. 16 was observed.

It was found that a fast component exists, that shifts the polarization state by 180° with a 10–90% rise time below 20 ms. It was found that within 50 ms, 95% of the shift was completed and that the last 5% could take over one second.

Conclusion: As predicted by the previous experiment with the Helium-Neon laser, it is possible to induce a large phase shift with little electrical power. Besides, this can be realized with fast response times.

Hence, it has been shown the possibility of an electrical control of the polarization of light in an optical fiber. This control can be realized with a device according to the present invention, comprising a fiber having internal, longitudinal electrodes. The device is based on the photo-elastic effect. This is achieved with low applied power, and fast response times can be reached.

In order to have the inventive device operative at 1550 nm, shorter pieces of metal-filled fiber may be used (instead of the 30-cm long piece used here). It should be pointed out that this is not to be confused with using a shorter contacted device (which was here only approximately 2 cm long), but refers to the actual length of fiber with electrode. Alternatively, the distance between the core and the electrode in the fiber could be increased. Both these solutions have been tested and gave excellent results. For example, the polarization dependent loss of a fully operational device between the wavelengths 1530 nm and 1570 nm was measured to be less than 0.1 dB.

Although polarization control was demonstrated with a single device, it is not possible to scan the whole polarization space with a single element. To this end, three controllers providing for $\lambda/4$, $\lambda/2$ and $\lambda/4$ adjustment may be employed (using the same principle as in mechanical polarization controllers). However, other combinations are also possible.

Further embodiments of the present invention will make use of other metal alloys with larger value of thermal expansion to improve the efficiency of the device.

Figure 18:
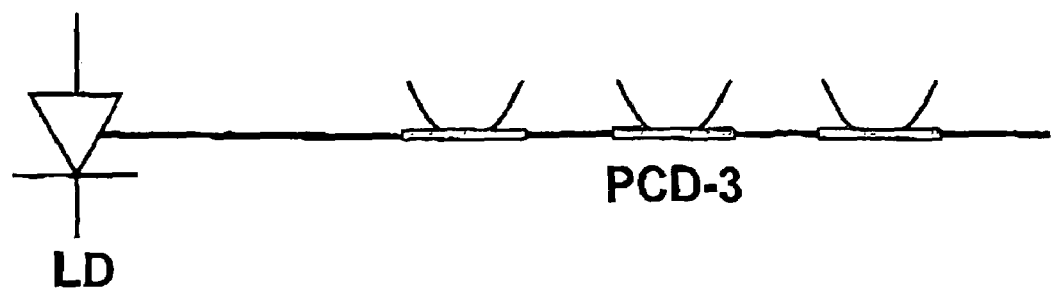
FIG. 18 schematically shows an arrangement for polarization control using three devices according to the invention.

Advantageously, the device according to the present invention can be used for control of the polarization state of the emission from a diode laser (LD), as schematically shown in FIG. 17. One way to achieve full control of the polarization from the diode laser, three polarization control devices (PCD:s) according to the invention are typically needed. The first to maintain linear polarization and possibly adjust it into the desired direction, and the second and third to convert the polarization state to circular by actuation in orthogonal axes. However, there are numerous other ways of achieving this control, the above-mentioned being one example only. This example is schematically shown in FIG. 18.

Figure 19:
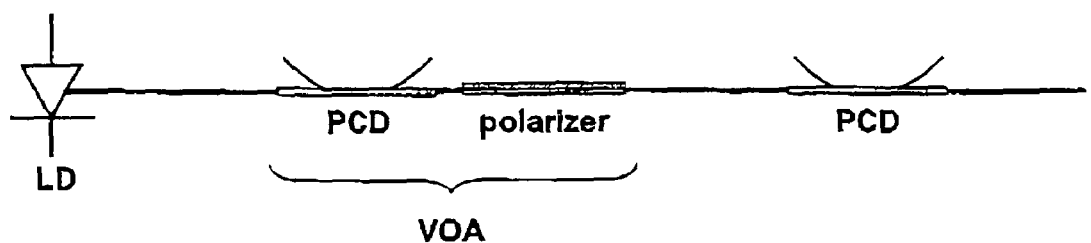
FIG. 19 schematically shows the use of a device according to the invention for realizing a variable optical attenuator.
Figure 20:
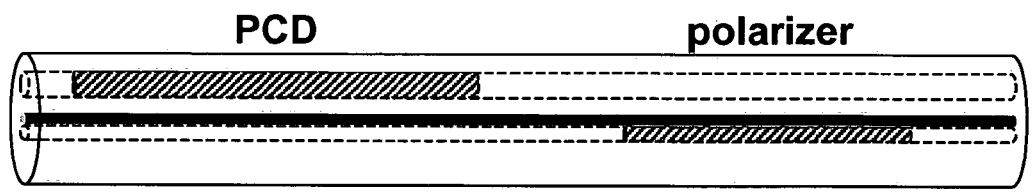
FIG. 20 shows a first example of how a polarizer can be implemented in the fiber.
Figure 21:
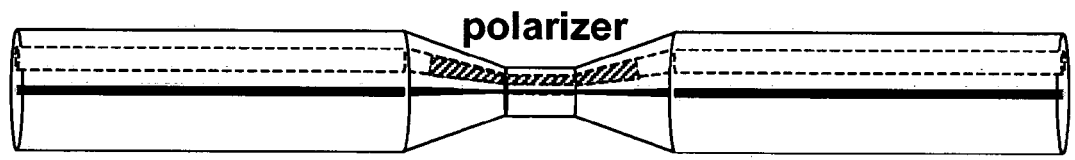
FIG. 21 shows a second example of how a polarizer can be implemented in the fiber.

Furthermore, by using a PCD according to the invention and also including a polarizer, a variable optical attenuator can be realized, as shown in FIG. 19. The polarizer may be implemented in the form of a conductor close to the fiber core (FIG. 20) or by means of a tapered hole in the fiber (FIG. 21).

Fibers with a plurality of electrodes disposed about the core can be used for selective control of the polarization in various directions. In such case, current is passed through one or more selected electrodes differently at different portions of the fiber. In this way, elements such as a differentiating device, a polarization scrambler, a modulator etc. can be realized.

Figure 22:
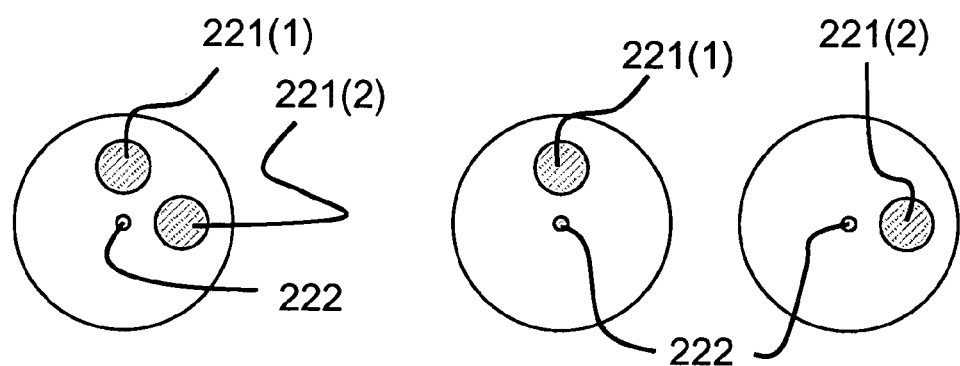
FIG. 22 schematically shows an end view of a fiber having two electrodes which can be activated in separate portions along the fiber.
Figure 23:
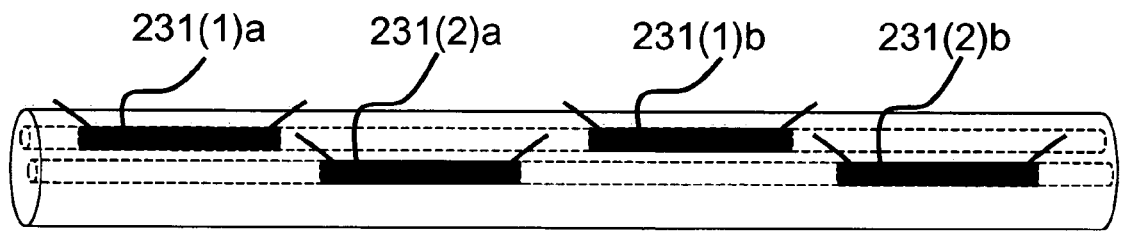
FIG. 23 schematically shows a side view of the fiber in FIG. 22, wherein each electrode is arranged for activation in two separate portions.

In FIG. 22, a particularly attractive arrangement is shown. When current flows, for example, in one of four electrodes in a fiber as illustrated in FIG. 2a, the electrode initially heats and expands, inducing an increase in birefringence of the fiber. When the heat from this current driven electrode reaches the other three electrodes in the fiber, they also expand and the total birefringence is strongly reduced nearly back to the value measured without any current. The birefringence can then be increased and decreased without waiting for the fiber to cool back to room temperature. The device responds optically to the differential of the current signal. In the shown case, the fiber includes two longitudinal, internal electrodes which are orthogonally disposed with respect to the fiber core. This means that the electrodes, when thermally expanded according to the present invention, will induce birefringence in the fiber core in two different and orthogonal directions. If the two electrodes were to be activated simultaneously, a resulting stress field would be obtained by vector addition. In the figure, this field would have a direction down and left. If, however, the two electrodes are activated in separated portions of the fiber, the effect is different because no vector addition will result. Instead, the effect of the first electrode (upstream) will be essentially cancelled by the second electrode (downstream). An arrangement with this kind of cascaded heating is schematically shown in FIG. 23. The shown example includes two heated portions 231(1)a, 231(1)b and 231(2)a, 231(2)b for each electrode. The external electric connections are shown as wire stubs at the ends of each electrode. It is to be noted that heating of an electrode is only effected between the feeding wires attached to the electrode, since current only flows through this portion of the electrode.

The principle schematically shown in FIGS. 22 and 23 can be used for obtaining faster switching. It should be recalled that the rise time for the device when the current is switched on is very fast, while the decline is much slower when the current is switched off. However, by using two cascaded and orthogonal electrodes as shown in FIGS. 22 and 23, the effect of the first electrode can be cancelled by the effect of the second electrode. By activating the second electrode a short time after the first electrode is activated, a fast switching is obtained. In other words, the fast rise time at the onset of the electric current is made use of both for inducing the birefringence and for canceling the birefringence. By driving such elements with a pseudo-random current signal, the polarization state becomes scrambled on a time scale given by the risetime of the PCD, namely less than a millisecond.

The device according to the invention can also be used for stabilizing the output from a Mach-Zehnder interferometer. In this case, the device is incorporated in one of the interferometer arms, and the output from the interferometer is monitored. A feedback to the driver means for the PCD then provides the desired output (maximizing or minimizing the light intensity). This is shown in FIG. 24.

Figure 24:
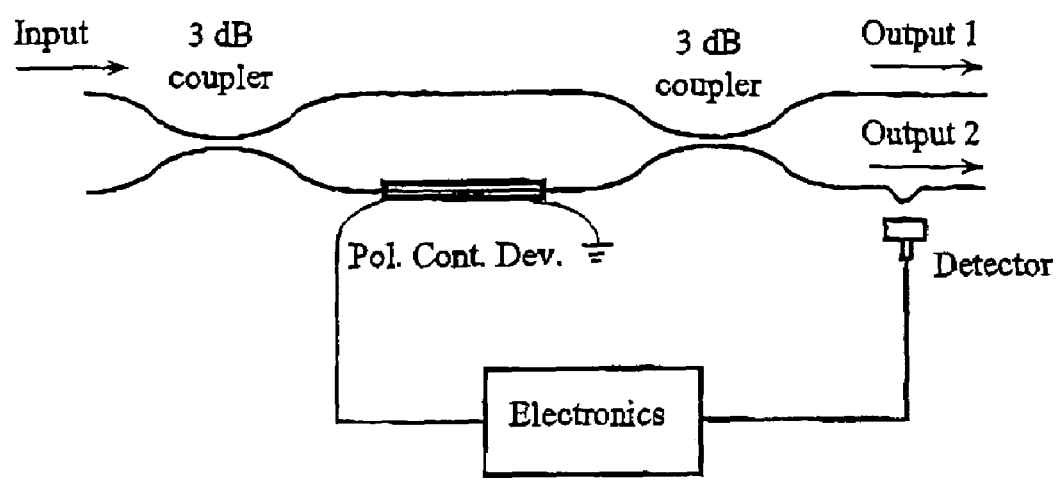
FIG. 24 shows how a device according to the invention is used for stabilizing a Mach-Zehnder interferometer and for optical switching.

The inventive device may also be used in conjunction with a Mach-Zehnder interferometer in order to provide an optical switch, in a similar way as shown in FIG. 24. By incorporating an optical device according to the present invention into one of the arms of the interferometer, phase changes may be induced and output may be electrically set to occur from a selected output. Preferably, in this case, the device is used together with a feedback arrangement that detects the optical power emitted from one or both outputs and controls the driver means of the device. In this way, desired power can be emitted from the desired output of the device. The switch as illustrated in FIG. 24 can be made polarizing by arranging the electrode close to the fiber core, or virtually polarization independent by arranging the electrode sufficiently far from the core to be outside the evanescent field from the core.

The skilled person will recognize that there are various other applications where the device and method according to the invention can be employed. Modification are also possible within the scope as defined in the appended claims. The embodiments described and shown are just preferred examples of how the invention can be carried out.

What is claimed is:

1. An optical device, comprising:
an optical fiber with a core and a cladding,
at least one longitudinal electrode formed in the fiber, and
driver means for driving an electrical current through said at least one longitudinal electrode,
wherein said electrode and said driver means are adapted to induce refractive index changes in a core of the optical fiber by producing thermally induced stress by means of a thermal expansion of the electrode, said thermal expansion being induced by ohmic heating from an electrical current flowing through the electrode.

2. A device as claimed in claim 1, wherein the fiber comprises a scattering center that makes a portion of the fiber leaky, such that some of the light propagating therein can be coupled out and analyzed.

3. A device as claimed in claim 2, wherein the scattering center comprises a local disturbance in the fiber geometry.

4. A device as claimed in claim 2, wherein the scattering center comprises a bend of the fiber.

5. A device as claimed in claim 1, wherein the or each electrode is provided in the cladding of the fiber adjacent the core.

6. A device as claimed in claim 5, wherein the or each electrode comprises a Sn—Bi alloy.

7. A device as claimed in claim 1, wherein the or each longitudinal electrode is provided within a longitudinal hole in the optical fiber, such that said hole is entirely filled with electrode material in the radial direction.

8. A device as claimed in claim 7, wherein the or each electrode comprises a Sn—Bi alloy.

9. A device as claimed in claim 1, comprising a plurality of longitudinal electrodes disposed around the core of the fiber, such that current can be passed selectively along one or more of said plurality of electrodes in order to control the stress induced in the core.

10. A device as claimed in claim 9, wherein external wires are attached to the or each electrode for feeding current, said wires defining a length of electrode to be heated.

11. A device as claimed in claim 1, wherein the or each electrode comprises a Sn—Bi alloy.

12. A device as claimed in claim 1, wherein the electrode and the driver means are adapted to induce an asymmetrical field or stress in the core of the fiber, thereby inducing birefringence in the core.

13. A device as claimed in claim 1, further comprising a fixed polarizer in the fiber, whereby variable optical attenuation can be obtained by controlling the current passed through the electrode.

14. A device as defined in claim 1 for stabilizing output from a Mach-Zehnder interferometer that is arranged in one arm of said interferometer so that feedback is can be provided.

15. A device as defined in claim 1 that is incorporated into one arm of a Mach-Zehnder interferometer for providing an optical switch in which output can be controlled to occur from a selected output.

16. A method for polarization control of the emission from a laser diode, wherein the light from the laser diode is passed through the device of claim 1, and said device is controlled such that the desired polarization is obtained.

17. A method for variable optical attenuation of a light signal propagating in an optical fiber utilizing the device of claim 1, wherein the light is also directed through a polarizer.

18. A method of altering a refractive index of a core of an optical fiber, said fiber having at least one longitudinal electrode arranged within the fiber along said core, comprising the step of:
    passing an electric current through said electrode in order to induce ohmic heating thereof, said heating resulting in thermal expansion of the electrode subjecting the core of the fiber to stress.

19. A method as claimed in claim 18, wherein the core of the fiber is subjected to asymmetrical stress such that birefringence is induced in the core of the fiber.

20. A method as claimed in claim 19, wherein the electric currents are selectively passed through one or more of a plurality of longitudinal electrodes.

21. A method as claimed in claim 20, wherein current is first switched on to pass through a first electrode and then switched on to pass through a second electrode, said first and second electrodes being orthogonally arranged around the core of the fiber, such as the onset of the first electrode switches the polarization state and the subsequent onset of the second electrode resets the polarization state.

22. A method as claimed in claim 18, wherein current is passed through a confined length of electrode in the fiber, thermal expansion thereby being effected only over said confined length.

23. A method as claimed in claim 20, wherein stress in the core is induced in different directions in different lengths of the fiber.

* * * * *